US012184588B2

(12) United States Patent
Lee et al.

(10) Patent No.: US 12,184,588 B2
(45) Date of Patent: Dec. 31, 2024

(54) ANTENNA OPTIMIZATION METHOD IN MULTIPLE CONNECTION ENVIRONMENT AND ELECTRONIC DEVICE USING SAME

(71) Applicant: Samsung Electronics Co., Ltd., Suwon-si (KR)

(72) Inventors: Youngkwon Lee, Suwon-si (KR); Myungjin Kang, Suwon-si (KR); Hyungjoon Yu, Suwon-si (KR); Changhwa Lee, Suwon-si (KR); Sohee Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 297 days.

(21) Appl. No.: 17/584,897

(22) Filed: Jan. 26, 2022

(65) Prior Publication Data
US 2022/0150038 A1 May 12, 2022

Related U.S. Application Data

(63) Continuation of application No. PCT/KR2020/009242, filed on Jul. 14, 2020.

(30) Foreign Application Priority Data

Jul. 26, 2019 (KR) .................. 10-2019-0091161

(51) Int. Cl.
H04L 5/00 (2006.01)
H04B 1/00 (2006.01)
H04W 88/06 (2009.01)

(52) U.S. Cl.
CPC ........... *H04L 5/0098* (2013.01); *H04B 1/006* (2013.01); *H04L 5/0048* (2013.01); *H04W 88/06* (2013.01)

(58) Field of Classification Search
CPC ... H04L 5/0098; H04L 5/0048; H04L 5/0053; H04L 5/0092; H04B 1/006; H04B 1/00;
(Continued)

(56) References Cited

U.S. PATENT DOCUMENTS 8,126,410 B2 2/2012 Alon et al.
8,369,796 B2 2/2013 Pan et al.
(Continued)

FOREIGN PATENT DOCUMENTS

CN 101777703 A * 7/2010
KR 10-2011-0091760 A 8/2011
(Continued)

OTHER PUBLICATIONS

Korean Office Action dated Dec. 7, 2023, issued in Korean Patent Application No. 10-2019-0091161.
(Continued)

Primary Examiner — Dinh Nguyen
(74) Attorney, Agent, or Firm — Jefferson IP Law, LLP

(57) ABSTRACT

A method of operating an electronic device is provided. The method of operating an electronic device includes determining whether a multi-frequency band connection is established, when a result of the determination is that the multi-frequency band connection is established, identifying a frequency band transmitting control information from among connected multi-frequency bands, acquiring communication state information of the identified frequency band transmitting the control information, determining an antenna mode based on the acquired communication state information, and configuring at least one antenna based on the determined antenna mode.

16 Claims, 9 Drawing Sheets

(58) Field of Classification Search
CPC .......... H04B 1/401; H04B 1/44; H04B 17/10; H04B 17/309; H04B 1/0053; H04B 1/0064; H04B 17/103; H04W 88/06
See application file for complete search history.

(56) References Cited

U.S. PATENT DOCUMENTS

| | | | |
|---|---|---|---|
| 9,554,359 B2 | 1/2017 | Tabet et al. | |
| 9,680,510 B2 | 6/2017 | Broyde et al. | |
| 10,231,280 B2 | 3/2019 | Lee et al. | |
| 11,442,493 B2 | 9/2022 | Kim et al. | |
| 2008/0090528 A1 | 4/2008 | Malladi | |
| 2010/0120466 A1 | 5/2010 | Li | |
| 2011/0274071 A1* | 11/2011 | Lee | H04B 7/0626 370/328 |
| 2012/0250625 A1 | 10/2012 | Kim et al. | |
| 2014/0184440 A1 | 7/2014 | Park et al. | |
| 2016/0049924 A1 | 2/2016 | Broyde et al. | |
| 2016/0365909 A1 | 12/2016 | Kim et al. | |
| 2017/0317709 A1* | 11/2017 | Prendergast | H04B 1/401 |
| 2018/0084540 A1 | 3/2018 | Takeda et al. | |
| 2021/0165441 A1 | 6/2021 | Kim et al. | |

FOREIGN PATENT DOCUMENTS

| | | |
|---|---|---|
| KR | 10-1203591 B1 | 11/2012 |
| KR | 10-2014-0087790 A | 7/2014 |
| KR | 10-1424535 B1 | 8/2014 |
| KR | 10-2016-0135812 A | 11/2016 |
| KR | 10-2016-0145449 A | 12/2016 |
| KR | 10-1699860 B1 | 1/2017 |
| KR | 10-2017-0012447 A | 2/2017 |
| KR | 10-2017-0097920 A | 8/2017 |
| KR | 10-2019-0066810 A | 6/2019 |

OTHER PUBLICATIONS

Korean Notice of Patent Grant dated Jul. 24, 2024, issued in Korean Application No. 10-2019-0091161.

* cited by examiner

ANTENNA OPTIMIZATION METHOD IN MULTIPLE CONNECTION ENVIRONMENT AND ELECTRONIC DEVICE USING SAME

CROSS-REFERENCE TO RELATED APPLICATION(S)

This application is a continuation application, claiming priority under § 365(c), of an International application No. PCT/KR2020/009242, filed on Jul. 14, 2020, which is based on and claims the benefit of a Korean patent application number 10-2019-0091161, filed on Jul. 26, 2019, in the Korean Intellectual Property Office, the disclosure of which is incorporated by reference herein in its entirety.

BACKGROUND

1. Field

The disclosure relates to a method of optimizing an antenna in a multi-connection environment and an electronic device using the same.

2. Description of Related Art

With the development of digital technology, various types of electronic devices, such as mobile communication terminals, smartphones, tablet personal computers (PCs), electronic notebooks, personal digital assistants (PDAs), or wearable devices have come to be widely used.

In order to meet wireless data traffic demands, which have increased since the commercialization of the 4th-generation (4G) communication system, efforts to develop an improved 5th-generation (5G) communication system or a pre-5G communication system have been made. For this reason, the 5G communication system or the pre-5G communication system is called a beyond-4G-network communication system or a post-long term evolution (LTE) system.

In order to achieve a high data transmission rate, an implementation of the 5G communication system in a mmWave band (for example, 60 GHz band) is being considered. In the 5G communication system, technologies such as beamforming, massive MIMO, full dimensional MIMO (FD-MIMO), array antenna, analog beam-forming, and large-scale antenna technologies are being discussed as means to mitigate a propagation path loss in the ultrahigh-frequency band and increase a propagation transmission distance.

Further, in order to achieve a high data transmission rate, multiple wireless communication methods such as carrier aggregation (CA) and a non-standalone (NSA) scheme in which a 5G communication system and LTE coexist have been presented.

The above information is presented as background information only to assist with an understanding of the disclosure. No determination has been made, and no assertion is made, as to whether any of the above might be applicable as prior art with regard to the disclosure.

SUMMARY

When multiple signals such as a primary cell signal and a secondary cell signal are considered in a multi-connection environment in which connections to a plurality of wireless networks are simultaneously made, it may be required to configure antenna switch logic for securing the frequency performance in multiple connections in the terminal. Such an antenna configuration may have a trade-off in terms of the transmission and reception performance of the terminal and may include the radiation performance of the primary cell in compared to the case of a single connection.

Such a trade-off does not have a great influence on the terminal performance in a strong electric field in which an intensity of a transmitted and/or received signal is strong, but control information such as hybrid automatic repeat request (HARQ) information may not reach a base station due to the trade-off of the primary cell performance even though the terminal normally receives all signals in connected multiple wireless networks in a weak electric field or a shaded area in which an intensity of a transmitted and/or received signal is weak, and accordingly a terminal communication performance deterioration phenomenon such as a slow data response or a low speed may be generated due to continuous retransmission.

Through various embodiments, the transmission performance of a cell transmitting control information can be improved by a determination of communication conditions of the terminal and dynamic branch of the antenna configuration of the primary cell and the second cell.

Aspects of the disclosure are to address at least the above-mentioned problems and/or disadvantages and to provide at least the advantages described below. Accordingly, an aspect of the disclosure is to provide a method of optimizing an antenna in a multi-connection environment and an electronic device using the same.

Additional aspects will be set forth in part in the description which follows and, in part, will be apparent from the description, or may be learned by practice of the presented embodiments.

In accordance with an aspect of the disclosure, an electronic device is provided. The electronic device includes at least one antenna configured to transmit and receive a wireless signal, at least one processor operatively connected to the at least one antenna, and at least one memory operatively connected to the at least one processor, wherein the at least one memory stores instructions causing the at least one processor to, when executed, determine whether multiple frequency band connections are configured, identify a frequency band for transmitting control information among the connected multiple frequency bands when the multiple frequency band connections are configured, based on a result of the determination, acquire communication state information of the identified frequency band for transmitting the control information, determine an antenna mode, based on the acquired communication state information, and configure the at least one antenna, based on the determined antenna mode.

In accordance with another aspect of the disclosure, a method of operating an electronic device is provided. The method includes determining whether multiple frequency band connections are configured, identifying a frequency band for transmitting control information among the connected multiple frequency bands when the multiple frequency band connections are configured, acquiring communication state information of the identified frequency band for transmitting the control information, determining an antenna mode, based on the acquired communication state information, and configuring at least one antenna, based on the determined antenna mode.

According to various embodiments, the terminal can reduce a possibility of transmission failure of control information by improving the transmission performance of a cell transmitting the control information.

According to various embodiments, it is possible to prevent a terminal communication performance deterioration phenomenon such as a slow data response or a low speed caused by retransmission by reducing an HARQ transmission failure possibility.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
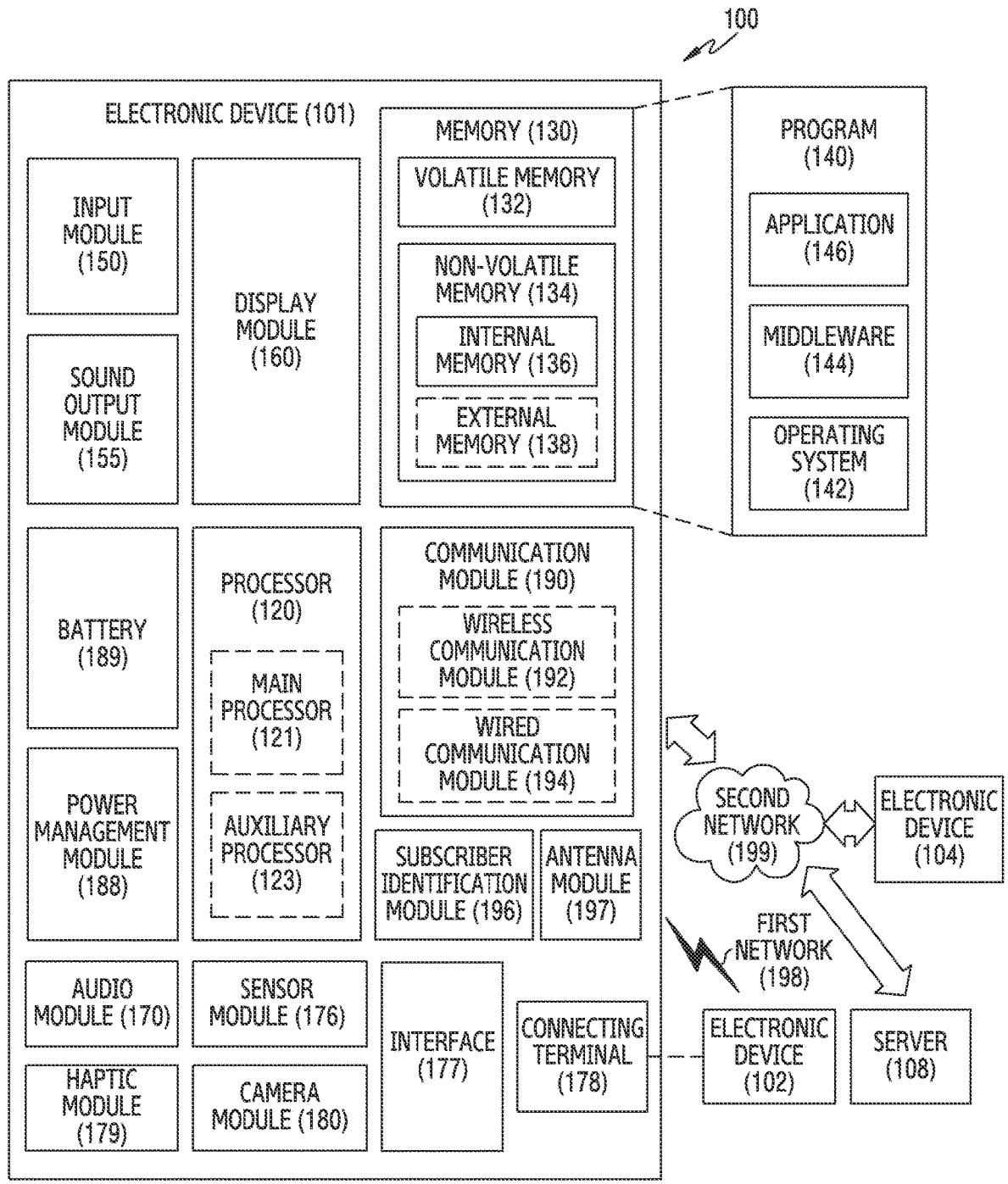
FIG. 1 is a block diagram illustrating an electronic device within a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for receiving incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
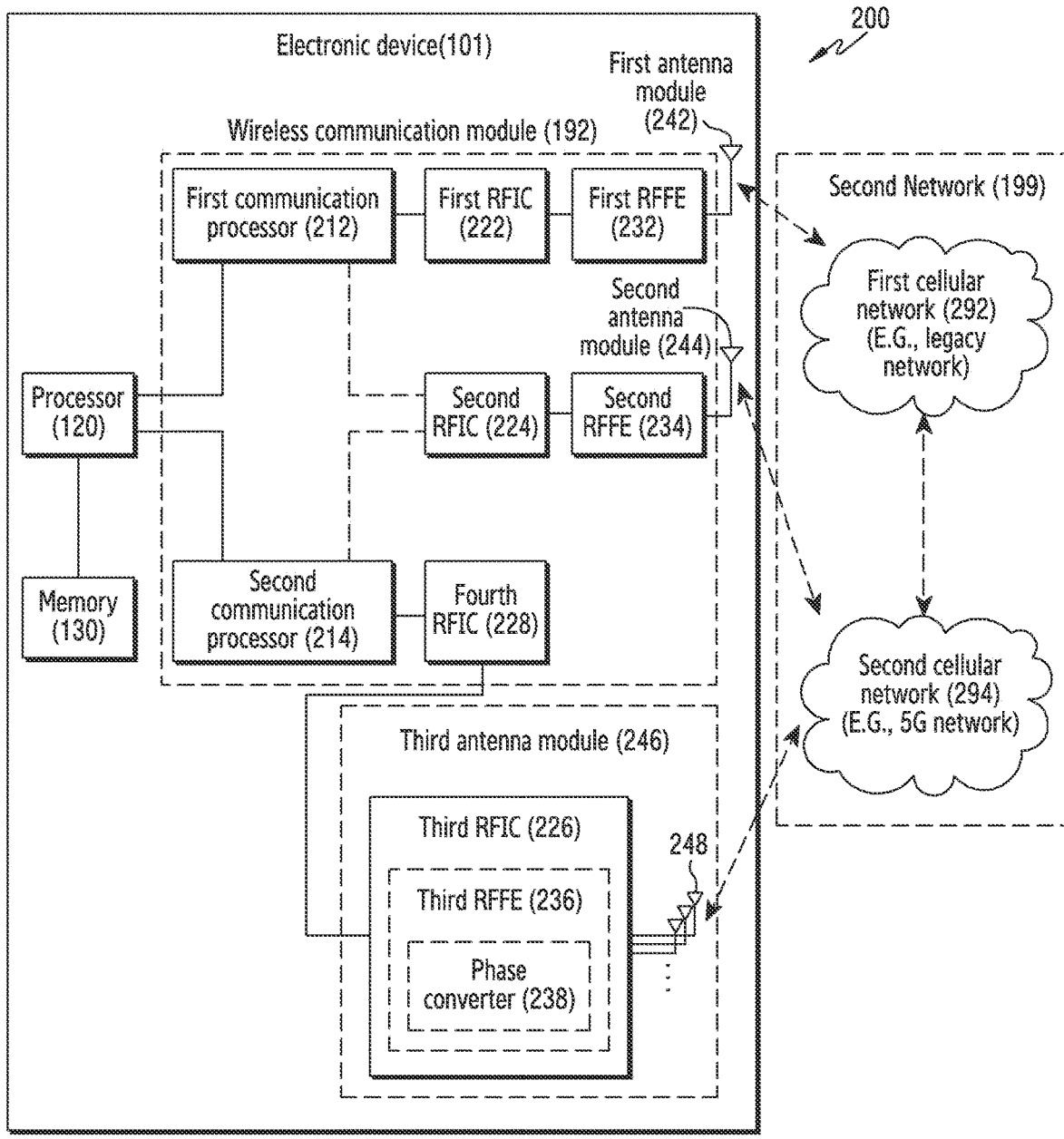
FIG. 2 illustrates a structure of an antenna module for transmitting and receiving a signal through an antenna according to an embodiment of the disclosure.

FIG. 2 is a block diagram 200 illustrating the electronic device 101 in a network environment including a plurality of cellular networks according to an embodiment of the disclosure.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and antennas 248. The electronic device 101 may further include the processor 120 and the memory 130. A second network 199 may include a first cellular network 292 and a second cellular network 294. According to an embodiment, the electronic device 101 may further include at least one element among the elements illustrated in FIG. 1, and the second network 199 may further include at least one other network. According to another embodiment, the first communication processor 212, the second communication processor 214, the first RFIC 222, the second RFIC 224, the fourth RFIC 228, the first RFFE 232, and the second RFFE 234 may configure at least a portion of the wireless communication module 192.

According to further another embodiment, the fourth RFIC 228 may be omitted or may be included as a portion of the third RFIC 226.

The first communication processor 212 may support establishment of a communication channel in a band to be used for wireless communication with the first cellular network 292 and legacy network communication through the established communication channel According to an embodiment, the first cellular network may be a legacy network including a second generation (2G), 3G, 4G, or LTE network. The second communication processor 214 may support establishment of a communication channel corresponding to a predetermined band (for example, about 6 GHz to about 60 GHz) among bands to be used for wireless communication with the second cellular network 294 and 5G network communication through the established communication channel According to another embodiment, the second cellular network 294 may be a 5G network defined by the 3rd Generation Partnership Project (3GPP). According to further another embodiment, the first communication processor 212 or the second communication processor 214 may support establishment of a communication channel corresponding to another predetermined band (for example, equal to or lower than about 6 GHz) among bands to be used for wireless communication with the second network 294 and 5G network communication through the established communication channel According to an embodiment, the first communication processor 212 and the second communication processor 214 may be implemented within a single chip or a single package. According to another embodiment, the first communication processor 212 or the second communication processor 214 may be configured within a single chip or a single package together with the processor 120, the auxiliary processor 123, or the communication module 190. According to further another embodiment, the first communication processor 212 and the second communication processor 214 may be directly or indirectly connected to each other through an interface (not shown) and may receive data or control signals in one direction or both directions.

In transmission, the first RFIC 222 may convert a baseband signal generated by the first communication processor 212 into a radio frequency (RF) signal from about 700 MHz to about 3 GHz used for the first network 292 (for example, legacy network). In reception, the RF signal may be acquired from the first network 292 (for example, legacy network) through an antenna (for example, the first antenna module 242) and may be preprocessed through the RFFE (for example, first RFFE 232). The first RFIC 222 may convert the preprocessed RF signal into a baseband signal to be processed by the first communication processor 212.

In transmission, the second RFIC 224 may convert a baseband signal generated by the first communication processor 212 or the second communication processor 214 into an RF signal (hereinafter, referred to as a 5G Sub6 RF signal) in a Sub6 band (for example, equal to or lower than about 6 GHz) used in the second network 294 (for example, 5G network). In reception, a 5G Sub6 RF signal may be acquired from the second cellular network 294 (for example, 5G network) through an antenna (for example, the second antenna module 244) and may be preprocessed through the RFFE (for example, second RFFE 234). The second RFIC 224 may convert the preprocessed 5G Sub6 RF signal into a baseband signal to be processed by the corresponding communication processor among the first communication processor 212 or the second communication processor 214.

The third RFIC 226 may convert a baseband signal generated by the second communication processor 214 into an RF signal (hereinafter, referred to as a 5G Above6 RF signal) in a 5G Above6 band (for example, from about 6 GHz to about 60 GHz) used by the second network 294 (for example, 5G network). In reception, a 5G Above6 RF signal may be acquired from the second network 294 (for example, 5G network) through an antenna (for example, the antenna 248) and may be preprocessed through the third RFFE 236. The third RFIC 226 may convert the preprocessed 5G Above6 RF signal into a baseband signal to be processed by the second communication processor 214. According to an embodiment, the third RFFE 236 may be configured as a portion of the third RFIC 226.

The electronic device 101 may include the fourth RFIC 228 separately from the third RFIC 226 or as at least a portion thereof. For example, after converting a baseband signal generated by the second communication processor 214 into an RF signal (hereinafter, referred to as an IF signal) in an intermediate frequency band (for example, about 9 GHz to about 11 GHz), the fourth RFIC 228 may transmit the IF signal to the third RFIC 226. The third RFIC 226 may convert the IF signal into a 5G Above6 RF signal. In reception, a 5G Above6 RF signal may be received from the second network 294 (for example, 5G network) through an antenna (for example, antenna 248) and converted into an IF signal by the third RFIC 226. The fourth RFIC 228 may convert the IF signal into a baseband signal to be processed by the second communication processor 214.

According to an embodiment, the first RFIC 222 and the second RFIC 224 may be implemented as at least a portion of a single chip or a single package. According to another embodiment, the first RFFE 232 and the second RFFE 234 may be implemented as at least a portion of a single chip or a single package. According to further another embodiment, at least one of the first antenna module 242 or the second antenna module 244 may be omitted or may be connected to another antenna module to process RF signals in a plurality of corresponding bands. According to an embodiment, the first antenna module 242 or the second antenna module 244 may be tunable antenna, and may be tuned by a configuration of the first communication processor 212 or the second communication processor 214.

According to an embodiment, the third RFIC 226 and the antenna 248 may be disposed on the same substrate to configure a third antenna module 246. For example, the wireless communication module 192 or the processor 120 may be disposed on a first substrate (for example, main PCB). For example, the third RFIC 226 may be disposed in a partial area (for example, bottom side) of a second substrate (for example, sub PCB) separated from the first substrate and the antennas 248 may be disposed in another partial area (for example, top side) to configure the third antenna module 246. By disposing the third RFIC 226 and the antennas 248 on the same substrate, it is possible to reduce the length of a transmission line therebetween. This is to reduce loss (for example, attenuation) of the signal in a high frequency band (for example, about 6 GHz to about 60 GHz) used for, for example, 5G network communication due to the transmission line. Accordingly, the electronic device 101 may improve a quality or speed of communication with the second cellular network 294 (for example, a 5G network).

According to an embodiment, the antennas 248 may be configured as an antenna array including a plurality of antenna elements which can be used for beamforming. For example, the third RFIC 226 may include, for example, a plurality of phase shifters 238 corresponding to the plurality of antenna elements as a portion of the third RFFE 236. In transmission, each of the plurality of phase shifters 238 may convert a phase of a 5G Above6 RF signal to be transmitted to the outside of the electronic device 101 (for example, a base station of the 5G network) through a corresponding antenna element. In reception, each of the plurality of phase shifters 238 may convert a phase of a 5G Above6 RF signal received from the outside through a corresponding antenna element into the same or substantially the same phases. This enables transmission or reception through beamforming between the electronic device 101 and the outside.

The second cellular network 294 (for example, 5G network) may operate independently from the first cellular network 292 (for example, legacy network) (for example, stand-alone (SA)) or operate through a connection to thereto (for example, non-stand along (NSA)). For example, in the 5G network, only an access network (for example, a 5G radio access network (RAN) or a next generation RAN (NG RAN)) may exist without a core network (for example, a next generation core (NGC)). For example, the electronic device 101 may access the access network of the 5G network and then access an external network (for example, Internet) under the control of the core network (for example, evolved packed core (EPC)) of the legacy network. Protocol information (for example, LTE protocol information) for communication with the legacy network and protocol information (for example, new radio (NR) protocol information) for communication with the 5G network may be stored in the memory 230 and may be accessed by another element (for example, the processor 120, the first communication processor 212, or the second communication processor 214).

Figure 3:
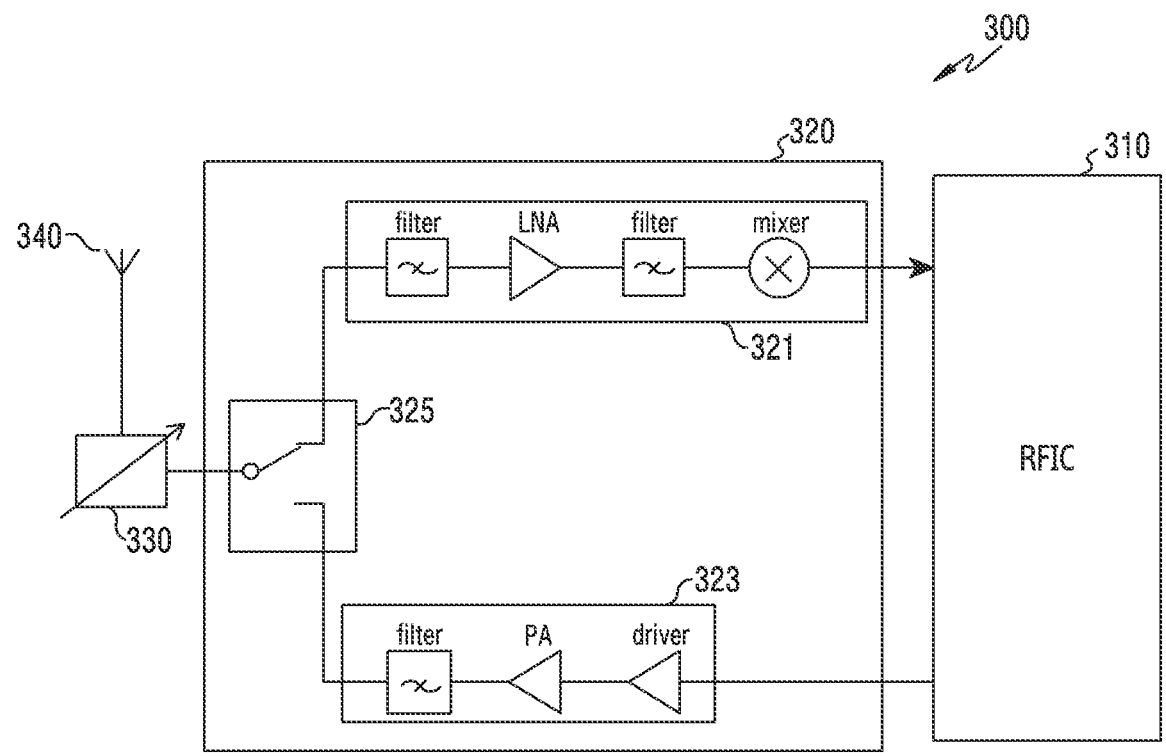
FIG. 3 illustrates return loss and a voltage standing wave ratio as characteristics of the antenna according to an embodiment of the disclosure.

FIG. 3 is a diagram 300 illustrating structures of RFFEs and a tunable antenna according to an embodiment of the disclosure.

Referring to FIG. 3, an electronic device (for example, the electronic device 101 of FIG. 1) may include a radio frequency integrated chip (RFIC) 310 (for example, the RFICs 222 and 224 of FIG. 2), an RFFE 320 (for example, the RFFEs 232 and 234 of FIG. 2) including a reception path 321, a transmission path 323, a switch 325, a tuner 330, and an antenna 340 (for example, the antenna modules 242 and 244 of FIG. 2) to transmit and receive a signal in a radio frequency band. According to an embodiment, the tuner 330 and the antenna 340 may be included in the antenna modules 242 and 244.

The RFIC 310 may convert a baseband signal into a radio frequency signal or inversely convert a radio frequency signal into a baseband signal.

The reception path 321 may perform a function of transmitting a signal received through the antenna 340 to the RFIC 310 and may include a low noise amplifier (LNA) and/or a mixer.

The transmission path 323 may perform a function transmitting a signal transmitted by the RFIC 310 to the switch 340 and may include a driver, a power amplifier (PA), and/or a filter.

The switch 325 may perform a function of connecting the antenna 340 to the reception path 321 or the transmission path 323 and may connect the antenna 340 to the reception path 321 when the electronic device 101 receives a signal and connect the antenna 340 to the transmission path 323 when the electronic device 101 transmits a signal.

The tuner 330 may be located between the antenna 340 and the switch 325 and may be configured to optimize the performance of the antenna 340 in an operation frequency band. According to an embodiment, when the antenna 340 is required to support both an LTE frequency band and a 5G communication frequency band, it is possible to optimize the performance of the antenna 340 in the LTE frequency band or in the 5G communication frequency band or optimize the performance of the antenna in both the LTE frequency band and the 5G communication frequency band by controlling the tuner 330.

According to an embodiment, the processor (for example, the first communication processor 212 or the second communication processor 214) of FIG. 2 may provide a control signal to the tuner so as to configure an antenna. Configuring the antenna may indicate making return loss for each frequency band of the antenna a required value as described in FIGS. 4A and 4B below. The processors 212 and 214 may have a plurality of preset tunable codes, and may control the tuner 330 by selecting one of the plurality of preset (or stored) tunable codes to configure the antenna to have desired return loss for each frequency band.

Figure 4A:
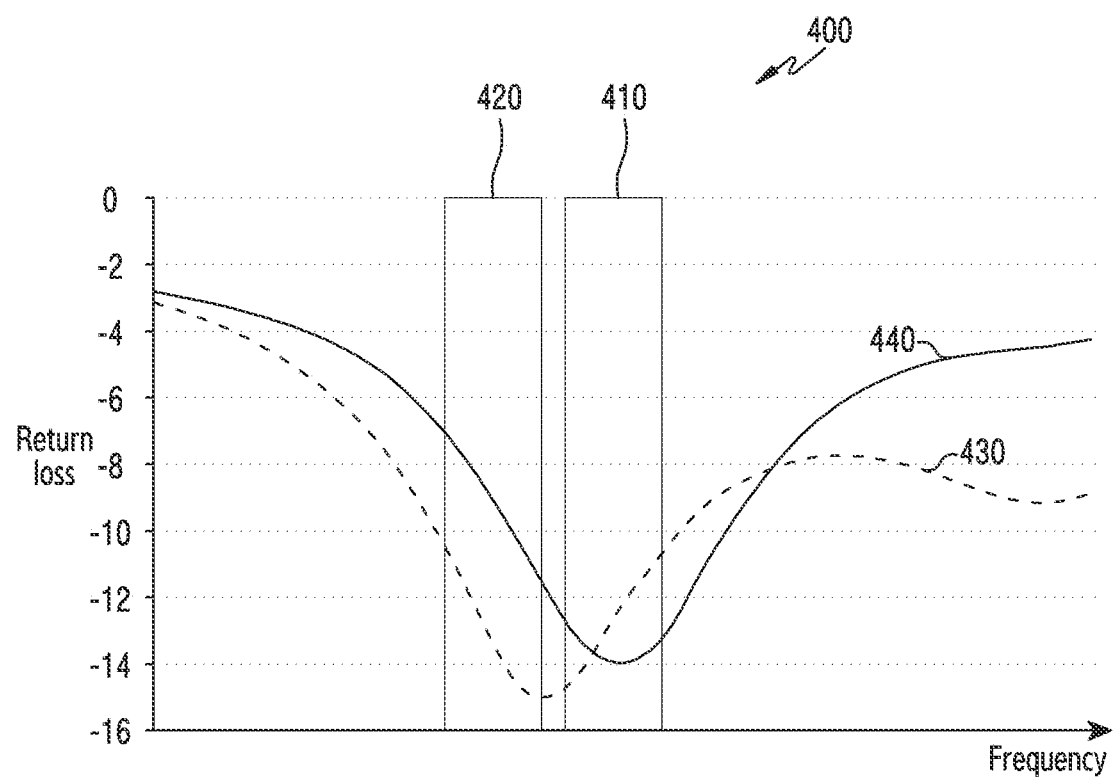
FIG. 4A illustrates an example of a functional configuration of the electronic device according to various embodiments of the disclosure.

FIG. 4A is a diagram 400 illustrating return loss as characteristics of the antenna according to an embodiment of the disclosure.

Figure 4B:
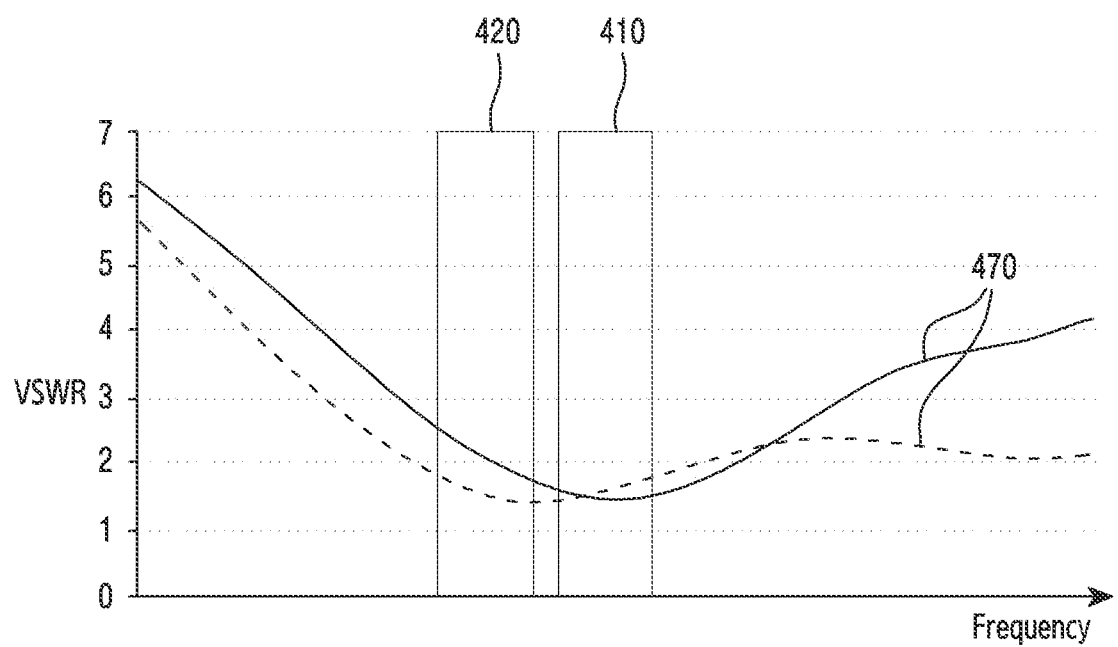
FIG. 4B illustrates an example of a functional configuration of the electronic device according to various embodiments of the disclosure.

FIG. 4B is a diagram 400 illustrating a voltage standing wave ratio as characteristics of the antenna according to an embodiment of the disclosure.

FIG. 4A illustrates return loss depending on a frequency of the antenna according to an embodiment, and the return loss indicates whether a signal transmitted or received through the antenna is lost by reflection, where smaller signal power may be reflected and larger signal power may be transmitted and received as the return loss is smaller.

FIG. 4B illustrates a voltage standing wave ratio (VSWR) depending on a frequency of the antenna 340 according to an embodiment. The voltage standing wave ratio is a value differently expressing return loss and may be a ratio of height of a standing wave generated by reflection. The standing wave is a stationary wave generated by a combination of two waves, one moving and meeting another medium and the other being reflected therefrom, and the size of the stationary standing wave may be larger as reflectance is larger.

The return loss and/or the voltage standing wave ratio may be used as an index indicating the performance of the antenna 340 in a specific frequency, and loss by reflection may be reduced and higher power may be transmitted or received only when the return loss and/or the voltage standing wave ratio is small in an operation frequency band of the antenna 340. Referring to the example of FIGS. 4A and 4B, in frequency division duplex (FDD) in which the frequency band 410 for transmission and the frequency band 420 for reception area different, the tuner 330 may configure the return loss and/or the voltage standing wave ratio of the antenna 340 to be small in both the frequency band 410 for transmission and the frequency band 420 for reception. In an embodiment, the return loss 430 in each frequency band may be configured to be minimized in the center frequency of the frequency band 410 for transmission and the frequency band 420 for reception as illustrated in FIG. 4A. In an embodiment, the voltage wave ratio 470 in each frequency band may be configured to be minimized in the center frequency of the frequency of the frequency band 410 for transmission and the frequency band 420 for reception as illustrated in FIG. 4B.

According to an embodiment, the electronic device 101 may be connected to two wireless networks like non-standalone (NSA) enhanced dual connectivity (EN-DN) supporting dual connectivity (DC) of LTE and next generation (NR), NR-DC supporting dual connectivity in NR, and multi-radio access technology dual connectivity including NG-RAN-E-UTRA DC (NGEN-DC) and NR-E-UTRA DC (NE-DC), the frequency bands 410 and 420 used by the two connected wireless networks are illustrated in FIGS. 4A and/or 4B, and even when the electronic device is connected to all of the two wireless networks through one antenna, it is required to configure return loss as small as possible in all of the two frequency bands 410 and 420 by controlling the tuner 330. Accordingly, the electronic device 101 may configure the return loss 430 in each frequency band to be minimized in the center frequency of the two frequency bands 410 and 420 by controlling the tuner 330 as illustrated in FIGS. 4A and 4B.

According to an embodiment, when the electronic device 101 uses two frequency bands by carrier aggregation (CA) or DC in one wireless network, the two used frequency bands 410 and 420 are illustrated in FIGS. 4A and/or 4B, and even when the electronic device is connected to all of the two frequency bands through one antenna, it is required to configure return loss as small as possible in all of the two frequency bands 410 and 420 by controlling the tuner 330. Accordingly, the electronic device 101 may configure the return loss 430 in each frequency band to be minimized in the center frequency of the two frequency bands 410 and 420 by controlling the tuner 330 as illustrated in FIG. 3. According to the result of the configuration, relatively small return loss may be provided in all of the two frequency bands 410 and 420.

According to an embodiment, even when the electronic device 101 is connected to two wireless networks through NR-DC and uses two or more frequency bands by the connection of SA or DC in each wireless network, the electronic device may configure return loss to be minimized for all frequency bands for transmitting and receiving signals through one antenna.

When the return loss 430 of FIGS. 4A and 4B is acquired by the above-described antenna configuration, the electronic device 101 may maintain the constant performance in all of the operated frequency bands. Meanwhile, in general, the base station may transmit signals with high power, but the electronic device 101 has limited power available for transmitting signals, and thus, when the electronic device 101 is in a weak electric field or a shaded area, the electronic device 101 may have a high possibility of normally receiving all signals from the base station of multiple networks but the base station of multiple networks has a relatively low possibility of receiving signals from the electronic device 101. Transmission failure of a control signal among the signals transmitted by the electronic device 101 may give a large influence on data transmission performance of the electronic device 101. In a comparative example, if the base station does not properly receive a signal including HARQ information indicating whether the electronic device 101 has received data or failed in data reception, the electronic device 101 may repeatedly retransmit the same data although the electronic device has received the data, and thus radio resources are wasted and a communication performance deterioration phenomenon of the electronic device 101 such as a slow data response or a low speed may be generated.

Various embodiments propose a method by which the electronic device 101 configuring the antenna 340 to minimize return loss (for example, return loss 440 of FIGS. 4A and 4B) in a frequency band for transmitting control information and an electronic device using the method.

According to an embodiment, as illustrated in FIG. 2, the wireless communication module 192 may transmit and receive signals for communication with the wireless networks 292 and 294 to which the electronic device 101 is connected. When the electronic device 101 has multiple connections to different wireless networks, the wireless communication module 192 may be connected to different wireless networks using one or more antennas. In an embodiment, when the wireless communication module 192 has multiple connections to the 5G wireless network 294 and the LTE wireless network 292, signals for the respective wireless networks may be transmitted or received through separate antennas (for example, the antenna modules 242 and 244) or transmitted or received through one antenna (for example, the antenna 340).

According to an embodiment, as illustrated in FIG. 3, the antenna 340 configured to transmit and/or receive signals may be a tunable antenna including the tuner 330, which is an antenna of which a center frequency, in other words, a frequency having the smallest return loss can be changed by controlling the tuner 330.

According to an embodiment, the processor (for example, the first communication processor 212 or the second communication processor 214) may control the center frequency of the tunable antenna 340 in the electronic device 101 performing communication using multiple frequency bands through a configuration of CA or EN-DC.

According to another embodiment, the processor 212 or 214 may determine whether the electronic device 101 uses multiple frequency bands, determine whether the electronic device 101 is in a weak electric field or a shaded area, and configure the configuration of the antenna 340 as the normal mode or the optimal mode based on the result. The optimal mode may be a mode of configuring the antenna 340 such that a frequency band for transmitting control signal has the smallest return loss, and the normal mode may be mode of configuring the antenna 340 such that all of the frequency bands operated according to the normal mode have relatively small return loss. In an embodiment, when the frequency band for transmitting a control signal including HARQ is 212 or 214, the normal mode may configure the antenna 340 to have return loss 430 of FIGS. 4A and 4B, and the optimal mode may configure the antenna 340 to have return loss 440 of FIGS. 4A and 4B.

According to further another embodiment, the processor 212 or 214 may determine whether the electronic device 101 uses multiple frequency bands, identify a frequency band for transmitting control information when it is identified that the multiple frequency bands are used, collect information on at least some of information related to signals transmitted in the frequency band for transmitting control information, signal reception quality, for example, transmission power, an uplink/downlink block error rate (BLER), reference signal received power (RSRP), reference signal received quality (RSRQ), information on whether TTI bundling of transmitting the same data simultaneously using a plurality of TTIs in uplink data transmission is activated, a bandwidth, a modulation and coding scheme (MCS), and a buffer status report (BSR) index, and determine whether a change in the antenna mode is needed on the basis thereof. The processor 212 or 214 may provide hysteresis by differently configuring a condition for changing the normal mode to the optimal mode and a condition for changing the optimal mode to the normal mode and accordingly reduce a possibility of repeatedly changing the normal mode and the optimal mode.

According to an embodiment, the processor 212 or 214 may consider at least one of a case in which transmission power and/or uplink BLER is higher than or equal to a predetermined value, a case in which TTIB is activated, or a case in which a quality of a received signal is equal to or smaller than a predetermined value as the condition to transition from the normal mode to the optimal mode. The processor 212 or 214 may consider at least one of a case in which transmission power and/or uplink BLER is equal to or smaller than a predetermined value, a case in which TTIB is deactivated, or a case in which a quality of a received signal is larger than or equal to a predetermined value as the condition to transition from the optimal mode to the normal mode. The processor 212 or 214 may differently configure conditions according to whether data communication or voice communication is currently performed.

In an embodiment, the processor 212 or 214 may configure at least one of the case in which RSRP is equal to or smaller than −80 dBm, the case in which transmission power is larger than or equal to 20 dBm, the case in which 30% or more of the BSR index is maintained for 3 seconds or longer, or the case in which the BLER is larger than or equal to 50% as the condition for changing the normal mode to the optimal mode in data communication.

According to an embodiment, when voice communication such as voice over LTE (VoLTE) is being performed, the processor 212 or 214 may configure at least one of the case in which RSRP is equal to or smaller than −100 dBm, the case in which transmission power is larger than or equal to 24 dBm, the case in which 40% or more of the BSR index is maintained for 2 seconds or longer, or the case in which a BLER is higher than or equal to 10% as the condition for changing the normal mode to the optimal mode.

Figure 5A:
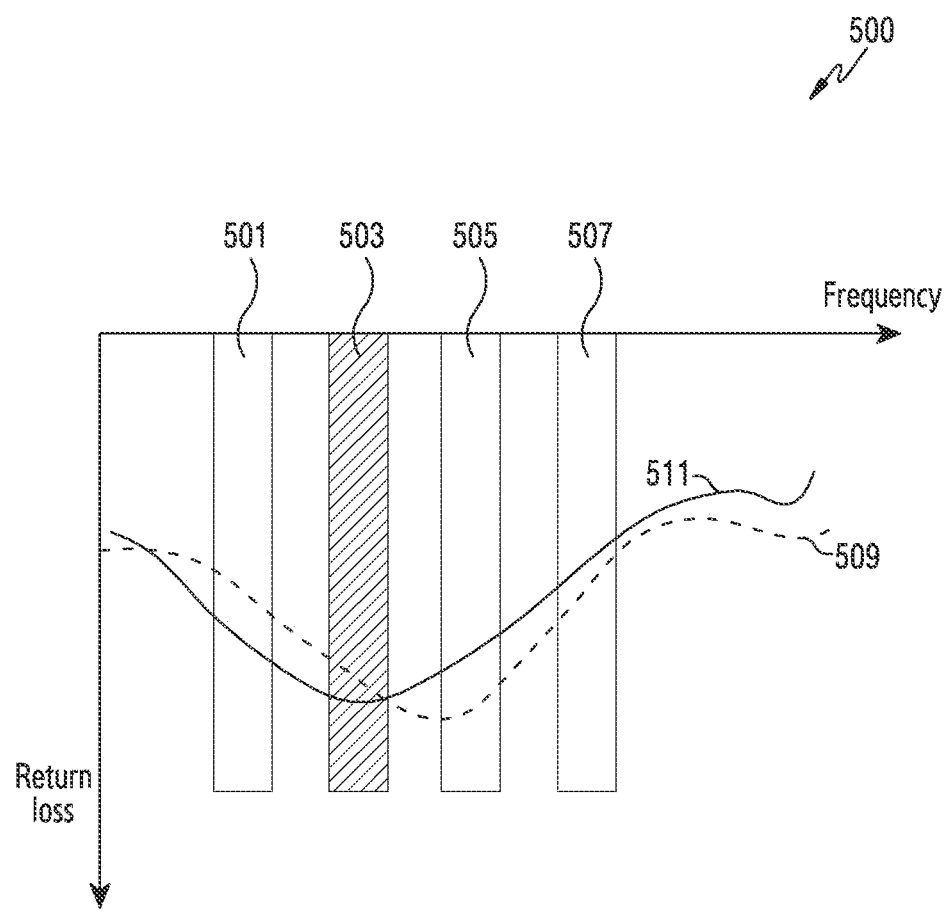
FIG. 5A illustrates an example of configuring the antenna according to various embodiments of the disclosure.

FIG. 5A is a diagram 500 illustrating examples of configuring the antenna according to various embodiments of the disclosure.

Figure 5B:
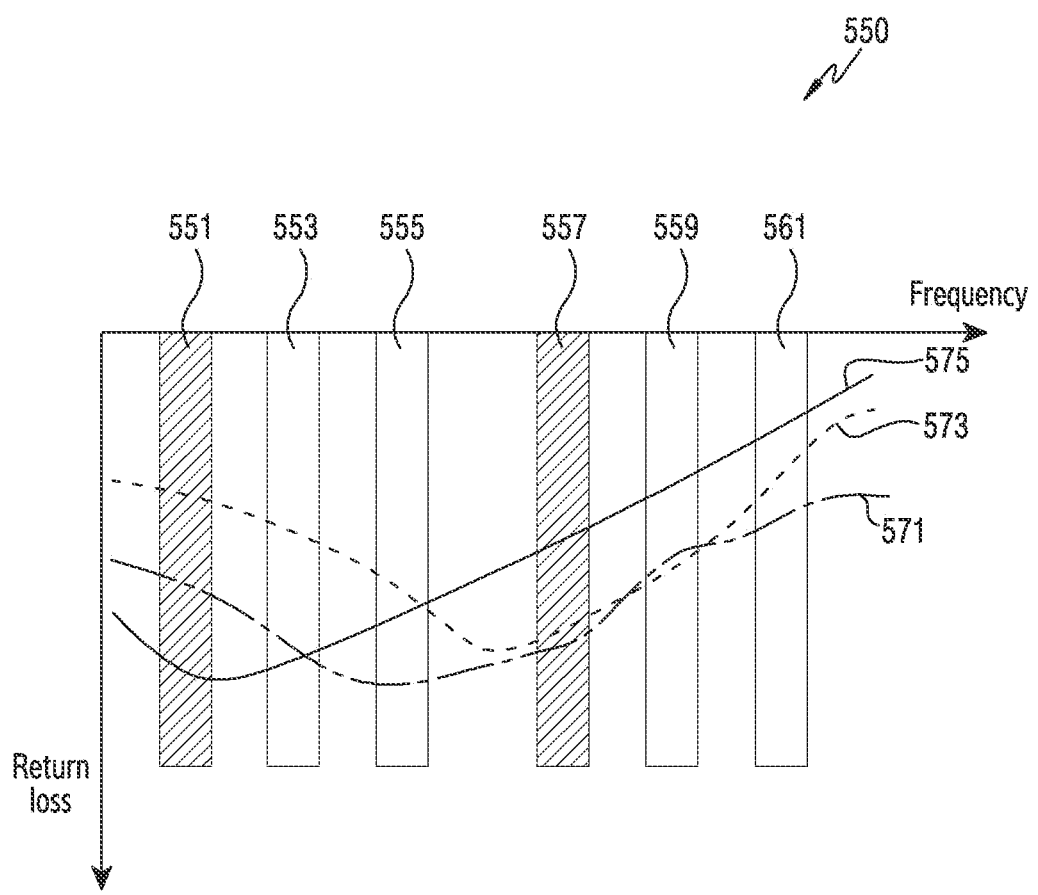
FIG. 5B illustrates an example of configuring the antenna according to various embodiments of the disclosure.

FIG. 5B is a diagram 550 illustrating examples of configuring the antenna according to various embodiments of the disclosure.

According to an embodiment, when the electronic device 101 transmits and receives signals through a plurality of frequency bands using one antenna, the antenna may be configured to have relatively small return loss in all of the plurality of frequency bands in the normal mode and to have the smallest return loss in a frequency band for transmitting a control mode in the optimal mode.

According to an embodiment, when signals are transmitted and received through two frequency bands using the same antenna by CA, that is, when an LTE B1 frequency band (2.1 GHz band) may be used as a primary component carrier (PCC) and an LTE B3 frequency band (1.8 GHz band) is used a secondary component carrier (SCC) in an embodiment, the processor 212 or 214 may configure a center frequency having the smallest return loss of the antenna as a center frequency (for example, 1.95 GHz) between the two bands to make the smallest return loss in both the B1 frequency band and the B3 frequency band in the normal mode. Further, the processor 212 or 214 may configure the antenna to minimize return loss in the B1 frequency band which is the PCC for transmitting a control mode in the optimal mode.

Referring to FIG. 5A, the electronic device 101 may be carrier-aggregated (CA) to use one antenna and four frequency bands 501, 503, 505, and 507. Among the four frequency bands, the second frequency band 503 may be a frequency band for transmitting control information including HARQ information. Then, the processor 212 or 214 may configure the antenna to minimize return loss in the center frequency of the four frequency bands 501, 503, 505, and 507 in the normal mode as indicated by reference numeral 509, and configure the antenna to minimize return loss in the second frequency band 503 in the optimal mode as indicated by reference numeral 511.

According to an embodiment, it is assumed that the electronic device 101 makes multiple connections to multiple wireless networks, and the respective connected wireless networks transmit and receive signals through different antennas. At this time, the connections to the respective wireless networks may be multiple connections and may use multiple frequency bands. In an embodiment, the electronic device 101 may be connected to both the LTE wireless network and the 5G wireless network through the EN-DC, and an antenna for transmitting and receiving signals to and from the LTE wireless network and antenna for transmitting and receiving signals to and from the 5G wireless network may use different antennas. Further, the respective wireless networks may have multiple connections therebetween. In the LTE wireless network, one primary cell (Pcell) and at least one secondary cell (Scell) may be connected using one antenna. In the 5G wireless network, one primary cell (Pcell) and at least one secondary cell (S cell) may also be connected using one antenna. Control information may separately operate in the respective wireless networks. In such an environment, the processor 212 or 214 may separately configure the normal mode or the optimal mode for the respective antennas. According to another embodiment, the processor 212 or 214 may determine whether to operate in the normal mode or the optimal mode by collecting communication state characteristics of a first antenna connected to the LTE wireless network. The processor 212 or 214 may configure the first antenna such that return loss becomes as small as possible in a frequency band used by all of one primary cell (Pcell) and at least one secondary cell (Scell) in the LTE wireless network (for example, 509 of FIG. 5A) when it is determined to operate in the normal mode, and configure the first antenna to minimize return loss in a frequency band used by the Pcell when it is determined to operate in the optimal mode (for example, 511 of FIG. 5A). In another example, the processor 212 or 214 may determine whether to operate in the normal mode or the optimal mode by collecting communication state characteristics of a second antenna connected to the 5G wireless network. The processor 212 or 214 may configure the second antenna such that return loss becomes as small as possible in a frequency band used by all of one primary cell (Pcell) and at least one secondary cell (Scell) in the 5G wireless network (for example, 509 of FIG. 5A) when it is determined to operate in the normal mode, and configure the first antenna to minimize return loss in a frequency band used by the Pcell when it is determined to operate in the optimal mode (for example, 511 of FIG. 5A).

According to an embodiment, when the connections are made through the two wireless networks and two different antennas as described above but transmission of control information uses only a specific wireless network, the antenna for the wireless network in which no control information is transmitted may not be configured as the optimal mode, and the antenna may be configured as the normal mode or the optimal mode, based on the operation of the antenna for the wireless network for transmitting control information.

According to an embodiment, it is assumed that the electronic device 101 makes multiple connections to multiple wireless networks through one antenna. For example, when separate control signals should be transmitted through the connected multiple wireless networks, the processor 212 or 214 may identify frequency bands (for example, 551 and 557 of FIG. 5B) in which control signals for respective wireless networks should be transmitted and perform control to make return loss as small as possible in all of the frequency bands in which control signals for respective wireless networks should be transmitted.

Referring to FIG. 5B, the electronic device 101 may have multiple connections to two wireless networks and may use multiple frequency bands to transmit and receive signals to and from the respective wireless networks. According to an embodiment, the electronic device 101 may have multiple connections to the LTE wireless network and the 5G wireless network, and may transmit and receive signals to and from the LTE wireless network through frequency bands 551, 553, and 555 and transmit and receive signals to and from the 5G wireless network through frequency bands 557, 559, and 561.

In such an environment, the processor 212 or 214 may configure the antenna to have small return loss in all of the frequency bands used for transmitting and receiving signals in the normal mode by controlling the tuner 330 (for example, 571 of FIG. 5B). In an embodiment, the processor 212 or 214 may configure the antenna to have small return loss in frequency bands including the frequency bands (for example, 551 and 557 of FIG. 5B) used for transmitting control information such as HARQ information in the optimal mode (for example, 573 of FIG. 5B). According to embodiment, the processor 212 or 214 may configure the antenna such that a frequency band having a higher bandwidth or having a higher MCS has the smallest return loss among the frequency bands for transmitting control information in the optimal mode (for example, 575 of FIG. 5B). A method according to the embodiment may be applied to the case in which a sufficiently desired result cannot be acquired by the first method, for example, the case in which the phenomenon of frequently generating retransmission still continues.

According to an embodiment, the memory 130 may store instructions executed by the processor 212 or 214 in order to perform the above-described operation. Further, the memory 130 may store a tunable code for configuring the antenna. The configurable tunable code may include a tunable code in the normal mode and/or a tunable code in the optimal mode. A characteristic of return loss for each frequency band of the antenna may be changed by a change in the tunable code.

According to an embodiment, the processor 212 or 214 of the electronic device 101 may increase the performance of the electronic device 101 adaptively depending on a surrounding environment by actively changing the antenna configuration in accordance with the current collected situation.

According to another embodiment, the processor 212 or 214 may enhance the wireless performance of the electronic device 101 by actively changing the antenna configuration in accordance with a transmission environment of a signal and preventing retransmission by non-reception of HARQ and improve a communication performance deterioration phenomenon such as a slow data response or a low data transmission rate that may be experience by the user in a weak electric field or a shaded area.

According to further another embodiment, the operation of the processor 212 or 214 may be performed by the wireless communication module 420. In an embodiment, the wireless communication module 420 may acquire a transition condition from the normal mode to the optimal mode and/or a transition condition from the optimal mode to the normal mode from the processor 212 or 214, perform the operation that should be performed by the processor 212 or 214, and configure the antenna 340 to operate in the normal mode or the optimal mode by controlling the tuner 330 of the antenna 340, based on the result.

According to an embodiment, an electronic device (for example, the electronic device 101 of FIG. 1) may include at least one antenna module (for example, the antenna module 197 of FIG. 1, the antenna modules 242 and 244 of FIG. 2, or the antenna modules 330 and 340 of FIG. 3), configured to transmit and receive a wireless signal, at least one processor (for example, the processor 120 of FIG. 1 or the processor 212 or 214 of FIG. 2) operatively connected to the at least one antenna module, and at least one memory (for example, the memory 130 of FIG. 1) operatively connected to the at least one processor, and the at least one memory may store instructions causing the at least one processor to, when executed, determine whether multiple frequency band connections are configured, identify a frequency band for transmitting control information among the connected multiple frequency bands when the multiple frequency band connections are configured on the basis of a result of the determination, acquire communication state information of the identified frequency band for transmitting the control information, determine an antenna mode, based on the acquired communication state information, and configure the at least one antenna module, based on the determined antenna mode.

According to an embodiment, the antenna mode may include a normal mode making return loss of all of the connected multiple frequency bands small and an optimal mode making return loss of the identified frequency band for transmitting control information small.

According to an embodiment, the instructions may cause the at least one processor to determine whether to change the antenna mode by using different transition conditions depending on whether a transmitted packet is a voice packet or a data packet.

According to another embodiment, the instructions may cause the at least one processor to be transitioned to the optimal mode according to a first transition condition when the transmitted packet is the voice packet and the antenna mode is the normal mode, be transitioned to the normal mode according to a second transition condition when the transmitted packet is the voice packet and the antenna mode is the optimal mode, be transitioned to the optimal mode according to a third transition condition when the transmitted packet is the data packet and the antenna mode is the normal mode, be transitioned to the normal mode according to a fourth transition condition when the transmitted packet is the data packet and the antenna mode is the optimal mode, and provide hysteresis by differently configuring the first transmission condition and the second transmission condition and differently configuring the third transition condition and the fourth transition condition.

According to an embodiment, each of the transition conditions may be based on at least one of a reception quality of a downlink signal, transmission power used in signal transmission, a buffer status report (BSR) index indicating an amount of data to be transmitted, a block error rate (BLER) indicating a rate of packets which have not yet been transmitted among transmitted packets, or information on whether transmit time interval bundling (TTIB) for transmitting an identical packet multiple times through a plurality of resources is activated.

According to an embodiment, the first transition condition may include at least one of a case in which reference signal received power (RSRP) is equal to or smaller than −110 dBm, a case in which transmission power is larger than 20 dBm, a case in which the BSR index is larger than or equal to 40% for 2 seconds, a case in which the BLER is larger than 10%, or a case of the TTIB is activated, and the second transition condition includes a case in which the BLER is smaller than 10%.

According to an embodiment, the third transition condition may include at least one of a case in which reference signal received power (RSRP) is equal to or smaller than −80 dBm, a case in which transmission power is larger than 20 dBm, a case in which the BSR index is larger than or equal to 30% for 3 seconds, a case in which the BLER is larger than 30%, or a case in which the TTIB is activated, and the fourth transition condition may include a case in which the BLER is smaller than 30%.

According to an embodiment, the instructions may cause the at least one processor to, when a number of identified frequency bands for transmitting control information is two or more, make return loss small in frequency bands including the two or more frequency bands or select one frequency band from among the two or more frequency bands and make return loss of the selected frequency band small as the optimal mode.

According to an embodiment, the antenna module may include an antenna and a tuner, and the instructions may cause the at least one processor to control return loss characteristics of the antenna by controlling the tuner according to the antenna mode.

According to an embodiment, the instructions may cause the at least one processor to, even when the determined antenna mode is the optimal mode, configure the antenna module according to the normal mode in a time interval in which the control information is not transmitted and configure the antenna module according to the optimal mode in a time interval in which the control information is transmitted.

Hereinafter, the operation in which the electronic device 101 changes the antenna configuration will be described.

Figure 6:
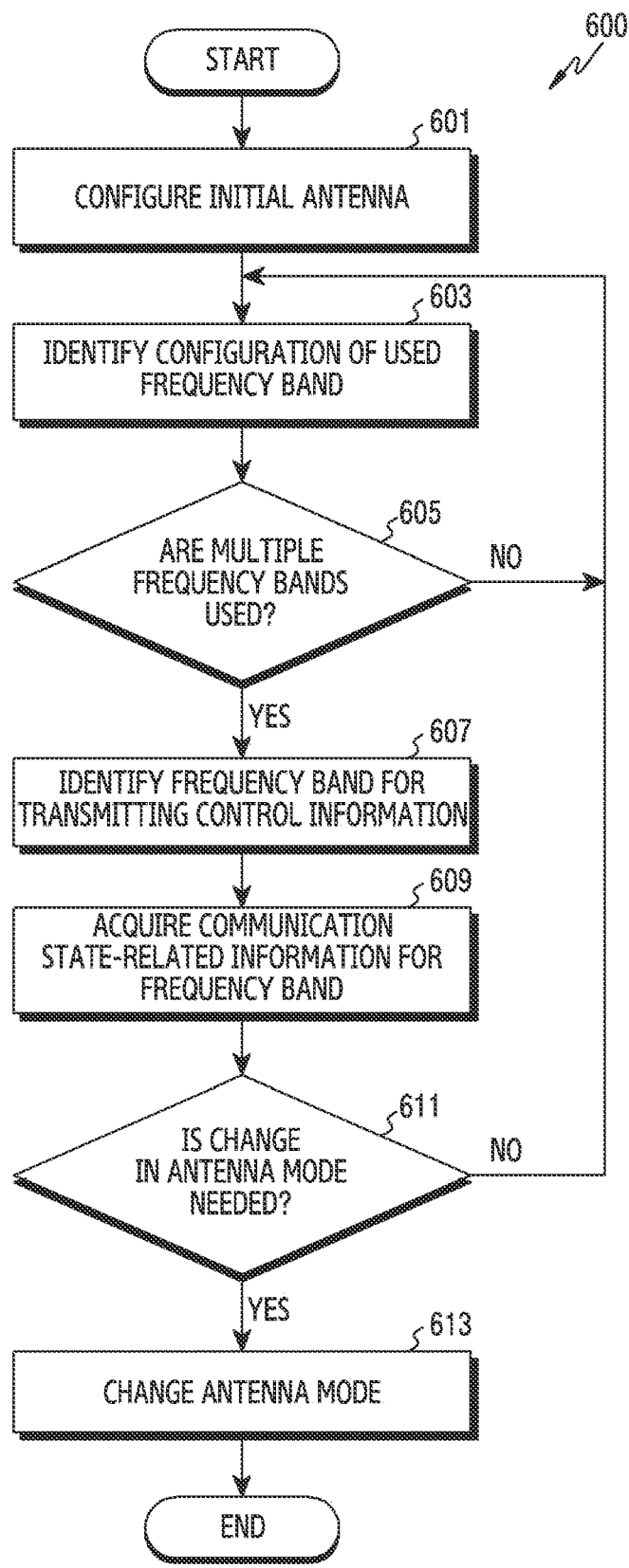
FIG. 6 is a flowchart illustrating an operation in which the electronic device changes an antenna configuration according to an embodiment of the disclosure.

FIG. 6 is a flowchart 600 illustrating an operation in which an electronic device changes an antenna configuration according to an embodiment of the disclosure. It may be understood that a subject of the operation in the flowchart 600 illustrated in FIG. 6 is an electronic device (for example, the electronic device 101 of FIG. 1) or a processor of the electronic device (for example, the processor 120 of FIG. 1 or the communication processor 212 or 214 of FIG. 2).

Referring to FIG. 6, in operation 601, the electronic device 101 may configure an initial antenna. When the electronic device 101 is connected to a wireless network, the electronic device may initially transmit and receive a signal using one frequency band. Thereafter, CA and/or EN-DC is activated and thus multiple connections may be possible. Accordingly, the electronic device 101 may configure the antenna to make return loss minimum in one used frequency band as a normal mode in the initial wireless network connection.

According to an embodiment, in operation 603, the electronic device 101 may identify a configuration of the used frequency band. In an embodiment, the electronic device 101 may identify whether to use a single frequency band or multiple frequency bands. The electronic device 101 may use two or more frequency bands in the same wireless network by activating a CA function after one wireless network connection or may use two or more frequency bands in different wireless networks through activation of an EN-DC function. The electronic device 101 may identify the configuration of the used frequency band, based on activation information of functions requiring the use of multiple frequency bands or frequency band use information implemented by the functions.

According to an embodiment, in operation 605, the electronic device 101 determines whether multiple frequency bands are used. When multiple frequency bands are not used, the configuration of the used frequency band may be identified again. In operation 605, the determination may be performed periodically or may be performed when the change in the configuration of the used frequency band is recognized in operation 603.

According to an embodiment, when it is determined that multiple frequency bands are not used (No of operation 605), the electronic device may return to operation 603 and identify the configuration of the used frequency band.

According to an embodiment, when it is determined that multiple frequency bands are used (Yes of operation 605), the electronic device 101 may acquire information on the frequency band in which control information is transmitted in operation 607. According to another embodiment, control information including HARQ information can be transmitted through a frequency band mainly used by a Pcell in an LTE environment, and the electronic device 101 may identify the frequency band used by the Pcell as the frequency band for transmitting control information. According to further another embodiment, in the case of LTE Inter Band UL-CA, control information may be transmitted in one of two uplink (UL) transmission frequency bands. For example, the electronic device 101 may identify a frequency band for transmitting control information, based on downlink control information (DCI) from the base station.

According to an embodiment, when the electronic device 101 is connected through the EN-DC of the 5G wireless network, the electronic device may further transmit control information in the frequency band of the 5G communication system as well as the frequency band of the LTE wireless network. For example, the number of frequency bands for transmitting control information may be identified as one or two.

According to an embodiment, in operation 609, the electronic device 101 may acquire communication state-related information of the identified frequency band to transmit control information. The communication state-related information may include at least one of transmission power or target power in signal transmission, a block error rate (BLER) of the uplink and/or the downlink, a received signal quality such as RSRP or RSRQ, whether TTI bundling is activated, a band allocated to transmit control information and/or an MCS, or a buffer status report (BSR) index indicating an amount of data waiting to be transmitted.

According to an embodiment, in operation 611, the electronic device 101 may determine whether an antenna mode change is needed. In an embodiment, the electronic device 101 may determine whether the electronic device is in a weak electric field or a shaded area and determine whether an antenna mode change is needed. The electronic device 101 may determine whether the electronic device is in a weak electric field or a shaded area, based on the communication state-related information acquired in operation 609. According to an embodiment, the antenna mode may be in a normal mode or an optimal mode. The optimal mode may be a mode in which a frequency band for transmitting a control signal has the smallest return loss, and the normal mode may be a mode in which the entire frequency band operated according to a general method has relatively small return loss.

According to an embodiment, the electronic device 101 may provide hysteresis by differently configuring a condition for changing the normal mode to the optimal mode and a condition for changing the optimal mode to the normal mode and accordingly reduce a possibility of repeatedly changing the normal mode and the optimal mode.

According to another embodiment, the electronic device 101 may consider the case in which transmission power and/or an uplink BLER is higher than or equal to a predetermined value, the case in which a TTIB is activated, or the case in which a received signal quality is equal to or smaller than a predetermined value as the condition for changing the normal mode to the optimal mode. Further, the electronic device 101 may consider the case in which transmission power and/or an uplink BLER is equal to or smaller than a predetermined value, the case in which a TTIB is deactivated, or the case in which a received signal quality is higher than or equal to a predetermined value as the condition for changing the optimal mode to the normal mode. In addition, the electronic device 101 may differently configure the condition according to whether data communication or voice communication is currently performed.

According to an embodiment, the electronic device 101 may configure at least one of the case in which RSRP is equal to or smaller than −80 dBm, the case in which transmission power is larger than or equal to 20 dBm, and the case in which 30% or more of the BSR index is maintained for 3 seconds or longer, or the case in which the BLER is larger than or equal to 50% as the condition for changing the normal mode to the optimal mode in data communication. According to another embodiment, when voice communication such as voice over LTE (VoLTE) is being performed, the processor 212 or 214 may configure at least one of the case in which RSRP is equal to or smaller than −100 dBm, the case in which transmission power is larger than or equal to 24 dBm, the case in which 40% or more of the BSR index is maintained for 2 seconds or longer, the case in which a BLER is higher than or equal to 10% as the condition for changing the normal mode to the optimal mode.

According to an embodiment, when it is determined that the antenna mode change is not needed based on the determination result of operation 611, the electronic device 101 may identify the configuration of the used frequency band again in operation 603 and, when it is determined that the antenna mode change is needed, perform operation 613.

According to an embodiment, in operation 613, the electronic device 101 may change the antenna mode from the normal mode to the optimal mode or from the optimal mode to the normal mode.

According to an embodiment, the electronic device 101 may periodically repeatedly perform the operation according to the flowchart 600 illustrated in FIG. 6 or trigger and perform an even such newly configuring or releasing CA or DC.

According to an embodiment, even in the optimal mode, the electronic device 101 may configure the antenna according to the normal mode in a time interval in which no control information is transmitted and configure the antenna according to the optimal mode only in a time interval in which there is control information to be transmitted.

Figure 7:
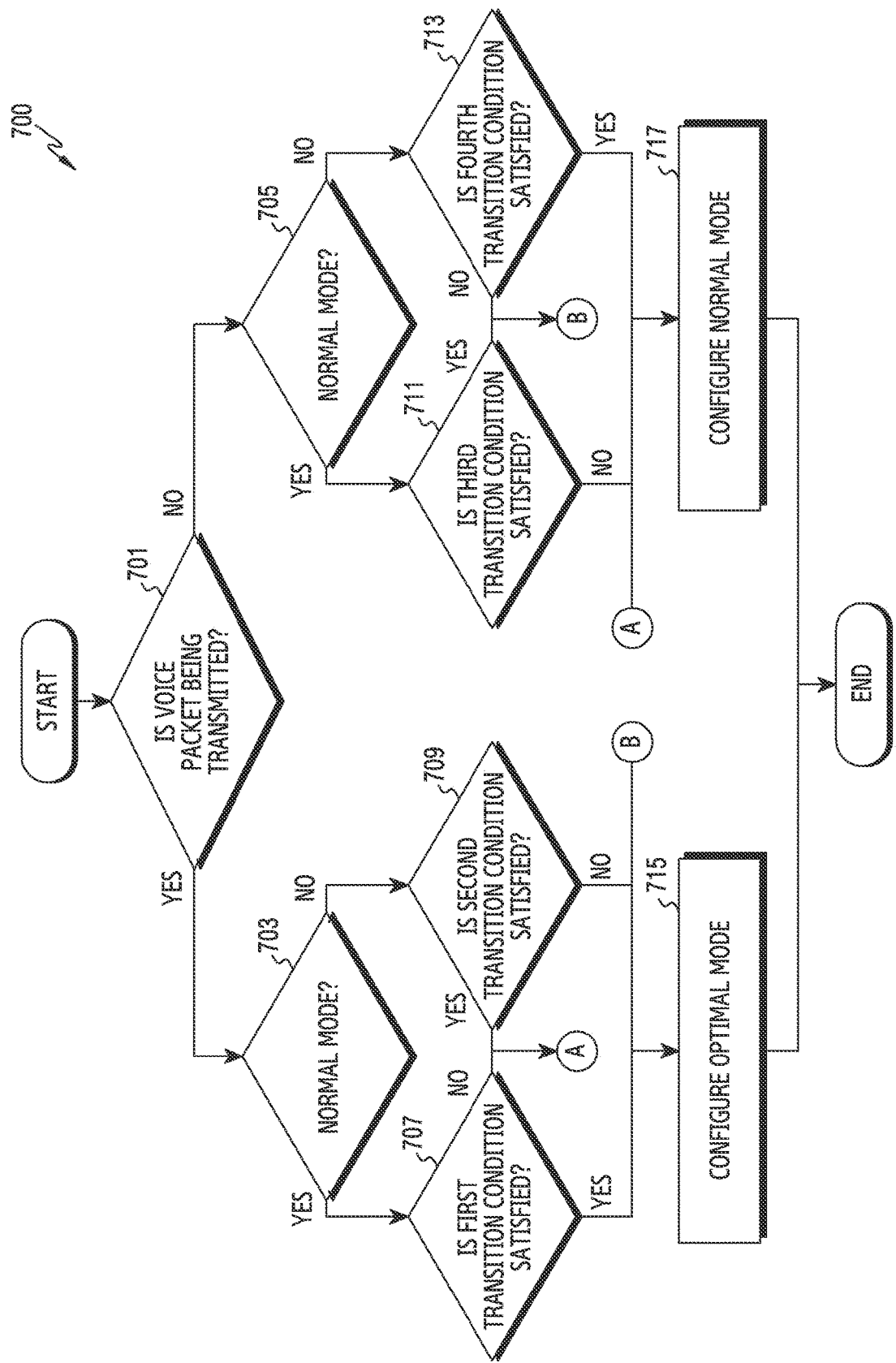
FIG. 7 is a flowchart illustrating an operation of determining whether to change an antenna mode according to an embodiment of the disclosure.

FIG. 7 is a flowchart 700 illustrating an operation of determining whether an antenna mode is changed according to an embodiment of the disclosure. It may be understood that a subject of the operation in the flowchart 700 illustrated in FIG. 7 is an electronic device (for example, the electronic device 101 of FIG. 1) or a processor of the electronic device (for example, the processor 120 of FIG. 1 or the second communication processor 212 or 214 of FIG. 2). The operation of FIG. 7 may be an embodiment of operation 611 of FIG. 6.

Referring to FIG. 7, in operation 701, the electronic device 101 may determine whether a voice packet is being transmitted. Since a condition for determining a mode change may vary depending on whether the voice packet is being transmitted or a data packet is being transmitted, the first electronic device 101 may first determine whether the voice packet is being transmitted or the data packet is being transmitted.

According to an embodiment, when the packet being transmitted is the voice packet (Yes of operation 701), it may be determined whether the current antenna mode is a normal mode or an optimal mode in operation 703. In the normal mode (Yes of operation 703), the electronic device may determine whether a first transition condition is satisfied, and may determine to configure the optimal mode in operation 715 when the first transition condition is satisfied (Yes of operation 707) in operation 707 and maintain the configuration of the normal mode when the first transition condition is not satisfied (No of operation 707). In the optimal mode, based on the determination result of operation 703 (No of operation 703), the electronic device may determine whether a second transition condition is satisfied, and may determine to configure the normal mode when the second transition condition is satisfied (Yes of operation 709) and maintain the configuration of the optimal mode when the second transition condition is not satisfied (No of operation 709). For example, it may be possible to provide hysteresis for preventing continuous transition by differently configuring the first transition condition and the second transition condition. According to another embodiment, the first transition condition may include at least one of the case in which RSRP is equal to or smaller than −110 dBm, the case in which transmission power is larger than 20 dBm, the case in which 40% or more of the BSR index is maintained for 2 seconds, the case in which a BLER is larger than 10%, or the case in which a TTIB is activated. The second transition condition may be the case in which the BLER becomes smaller than 10%.

According to an embodiment, when the packet being transmitted is the data packet, based on the determination of operation 701 (No of operation 701), the electronic device may determine whether the current antenna mode is the normal mode or the optimal mode in operation 705. In the normal mode (Yes of operation 705), the electronic device may determine whether a third transition condition is satisfied and may determine to configure the optimal mode 717 when the third transition condition is satisfied (Yes of operation 711) in operation 711 and maintain the configuration of the normal mode when the third transition condition is not satisfied (No of operation 711). In the optimal mode based on the determination result of operation 705 (No of operation 705), the electronic device may determine whether a fourth transition condition is satisfied in operation 713, and may determine to configure the normal mode when the fourth transition condition is satisfied (Yes of operation 713) and maintain the configuration of the optimal mode when the fourth transition condition is not satisfied (No of operation 713). For example, it may be possible to provide hysteresis for preventing continuous transition by differently configuring the third transition condition and the fourth transition condition. According to another embodiment, the third transition condition may include at least one of the case in which RSRP is equal to or smaller than −80 dBm, the case in which transmission power is larger than 20 dBm, the case in which 30% or more of the BSR index is maintained for 3 seconds, or the case in which a BLER is larger than 30%. The fourth transition condition may be the case in which the BLER becomes smaller than 30%.

According to an embodiment, a method of operating an electronic device (for example, the electronic device 101 of FIG. 1) may include an operation of determining whether multiple frequency band connections are configured, an operation of, when the multiple frequency band connections are configured, identifying a frequency band for transmitting control information among the connected multiple frequency bands, based on a result of the determination, an operation of acquiring communication state information of the identified frequency band for transmitting the control information, and an operation of configuring at least one antenna module, based on the determined antenna mode.

According to an embodiment, the antenna mode may include a normal mode making return loss of all of the connected multiple frequency bands small and an optimal mode making return loss of the identified frequency band for transmitting control information small.

According to an embodiment, the operation of determining whether to change the antenna mode may include an operation of determining whether to change the antenna mode by using different transition conditions depending on whether a transmitted packet is a voice packet or a data packet.

According to an embodiment, the operation of determining whether to change the antenna mode may include an operation of transitioning to the optimal mode according to a first transition condition when the transmitted packet is the voice packet and the antenna mode is the normal mode, an operation of transitioning to the normal mode according to a second transition condition when the transmitted packet is the voice packet and the antenna mode is the optimal mode, an operation of transitioning to the optimal mode according to a third transition condition when the transmitted packet is the data packet and the antenna mode is the normal mode, and an operation of transitioning to the normal mode according to a fourth transition condition when the transmitted packet is the data packet and the antenna mode is the optimal mode, and provide hysteresis by differently configuring the first transmission condition and the second transmission condition and differently configuring the third transition condition and the fourth transition condition.

According to an embodiment, each of the transition conditions may be based on at least one of a reception quality of a downlink signal, transmission power used in signal transmission, a buffer status report (BSR) index indicating an amount of data to be transmitted, a block error rate (BLER) indicating a rate of packets which have not yet been transmitted among transmitted packets, or information on whether transmit time interval bundling (TTIB) for transmitting an identical packet multiple times through a plurality of resources is activated.

According to an embodiment, the first transition condition may include at least one of a case in which reference signal received power (RSRP) is equal to or smaller than −110 dBm, a case in which transmission power is larger than 20 dBm, a case in which the BSR index is larger than or equal to 40% for 2 seconds, a case in which the BLER is larger than 10%, or a case of the TTIB is activated, and the second transition condition may include a case in which the BLER is smaller than 10%.

According to an embodiment, the third transition condition may include at least one of a case in which reference signal received power (RSRP) is equal to or smaller than −80 dBm, a case in which transmission power is larger than 20 dBm, a case in which the BSR index is larger than or equal to 30% for 3 seconds, a case in which the BLER is larger than 30%, or a case in which the TTIB is activated, and the fourth transition condition may include a case in which the BLER is smaller than 30%.

According to an embodiment, when a number of identified frequency bands for transmitting control information is two or more, the optimal mode may make return loss small in frequency bands including the two or more frequency bands or select one frequency band from among the two or more frequency bands and make return loss of the selected frequency band small as the optimal mode.

According to an embodiment, the operation of configuring the antenna mode may include an operation of controlling return loss characteristics of the antenna by controlling the tuner included in the antenna module according to the determined antenna mode.

According to an embodiment, even when the determined antenna mode is the optimal mode, the method may further include an operation of configuring the antenna module according to the normal mode in a time interval in which the control information is not transmitted and configuring the antenna module according to the optimal mode in a time interval in which the control information is transmitted.

According to an embodiment, when a number of at least one antenna module is two or more, when a number of at least one antenna module is two or more, the operation of determining whether to change the antenna mode may include an operation of determining whether to change the antenna mode independently for the two or more antenna modules, and the operation of changing the antenna mode by controlling the at least one antenna module may include an operation of changing the antenna mode of each of the two or more antenna modules by controlling each of the two or more antenna modules, based on the determination.

According to an embodiment, it is possible to reduce a possibility of transmission failure of control information and prevent a communication performance deterioration phenomenon of the electronic device such as a slow data response or a low speed caused by retransmission due to HARQ transmission failure by improving transmission performance in a frequency band for transmitting control information through an active change of the antenna mode to the normal mode or the optimal mode.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    at least one antenna configured to transmit and receive a wireless signal;
    a tuner;
    at least one processor; and
    at least one memory,
    wherein the at least one memory stores instructions, when executed by the at least one processor, causing the electronic device to:
        determine whether multiple frequency band connections are configured,
        identify a frequency band to transmit control information among the connected multiple frequency bands, when the multiple frequency band connections are configured, based on a result of determination,
        acquire communication state information of the identified frequency band for transmitting the control information,
        determine an antenna mode, based on the acquired communication state information, and
        configure the at least one antenna, based on the determined antenna mode,
    wherein the antenna mode includes:
        a first mode in which the tuner is set based on return losses of the multiple frequency bands, and a second mode in which the tuner is set based on return losses of frequency bands among the multiple frequency bands to which the control information is transmitted, and
    wherein in the second mode, a return loss of the frequency band over which the control information is transmitted is reduced compared to the first mode.

2. The electronic device of claim 1, wherein the instructions further cause the at least one processor to determine whether to change the antenna mode using different transition conditions depending on whether a transmitted packet is a voice packet or a data packet.

3. The electronic device of claim 2, wherein the instructions further cause the at least one processor to:
    be transitioned to an optimal mode according to a first transition condition when the transmitted packet is the voice packet and the antenna mode is a normal mode,
    be transitioned to the normal mode according to a second transition condition when the transmitted packet is the voice packet and the antenna mode is the optimal mode,
    be transitioned to the optimal mode according to a third transition condition when the transmitted packet is the data packet and the antenna mode is the normal mode,
    be transitioned to the normal mode according to a fourth transition condition when the transmitted packet is the data packet and the antenna mode is the optimal mode, and
    provide hysteresis by differently configuring the first transition condition and the second transition condition and differently configuring the third transition condition and the fourth transition condition.

4. The electronic device of claim 3, wherein each of the transition conditions is based on at least one of a reception quality of a downlink signal, transmission power used in signal transmission, a buffer status report (BSR) index indicating an amount of data to be transmitted, a block error rate (BLER) indicating a rate of packets which have not yet been transmitted among transmitted packets, or information on whether transmit time interval bundling (TTIB) for transmitting an identical packet multiple times through a plurality of resources is activated.

5. The electronic device of claim 4,
    wherein the first transition condition includes at least one of a case in which reference signal received power (RSRP) is equal to or smaller than −110 dBm, a case in which transmission power is larger than 20 dBm, a case in which the BSR index is larger than or equal to 40% for 2 seconds, a case in which the BLER is larger than 10%, or a case of the TTIB is activated, and
    wherein the second transition condition includes a case in which the BLER is smaller than 10%.

6. The electronic device of claim 4,
    wherein the third transition condition includes at least one of a case in which reference signal received power (RSRP) is equal to or smaller than −80 dBm, a case in which transmission power is larger than 20 dBm, a case in which the BSR index is larger than or equal to 30% for 3 seconds, a case in which the BLER is larger than 30%, or a case in which the TTIB is activated, and
    wherein the fourth transition condition includes a case in which the BLER is smaller than 30%.

7. The electronic device of claim 1, wherein the instructions further cause the at least one processor to, when a number of identified frequency bands for transmitting control information is two or more, make return loss small in frequency bands including the two or more frequency bands or select one frequency band from among the two or more frequency bands and make return loss of the selected frequency band small as an optimal mode.

8. The electronic device of claim 1, wherein the instructions further cause the at least one processor to, even when the determined antenna mode is an optimal mode, configure the at least one antenna according to a normal mode in a time interval in which the control information is not transmitted and configure the at least one antenna according to the optimal mode in a time interval in which the control information is transmitted.

9. A method of operating an electronic device, the method comprising:
    determining whether multiple frequency band connections are configured;
    identifying a frequency band to transmit control information among the connected multiple frequency bands when the multiple frequency band connections are configured;
    acquiring communication state information of the identified frequency band to transmit the control information;
    determining an antenna mode, based on the acquired communication state information; and
    configuring at least one antenna, based on the determined antenna mode,
    wherein the antenna mode includes:
        a first mode in which tuner is set based on return losses of the multiple frequency bands, and a second mode in which the tuner is set based on return losses of frequency bands among the multiple frequency bands to which the control information is transmitted, and wherein in the second mode, a return loss of the frequency band over which the control information is transmitted is reduced compared to the first mode.

10. The method of claim 9, wherein determining whether the antenna mode is changed comprises determining whether the antenna mode is changed by using different transition conditions depending on whether a transmitted packet is a voice packet or a data packet.

11. The method of claim 10, wherein determining whether to change the antenna mode includes:
   transitioning to an optimal mode according to a first transition condition when the transmitted packet is the voice packet and the antenna mode is a normal mode,
   transitioning to the normal mode according to a second transition condition when the transmitted packet is the voice packet and the antenna mode is the optimal mode,
   transitioning to the optimal mode according to a third transition condition when the transmitted packet is the data packet and the antenna mode is the normal mode, and
   transitioning to the normal mode according to a fourth transition condition when the transmitted packet is the data packet and the antenna mode is the optimal mode, and
   providing hysteresis by differently configuring the first transition condition and the second transition condition and differently configuring the third transition condition and the fourth transition condition.

12. The method of claim 11, wherein each of transition conditions are based on at least one of a reception quality of a downlink signal, transmission power used in signal transmission, a buffer status report (BSR) index indicating an amount of data to be transmitted, a block error rate (BLER) indicating a rate of packets which have not yet been transmitted among transmitted packets, or information on whether transmit time interval bundling (TTIB) for transmitting an identical packet multiple times through a plurality of resources is activated.

13. The method of claim 12, wherein the first transition condition includes at least one of a case in which reference signal received power (RSRP) is equal to or smaller than −110 dBm, a case in which transmission power is larger than 20 dBm, a case in which the BSR index is larger than or equal to 40% for 2 seconds, a case in which the BLER is larger than 10%, or a case of the TTIB is activated, and
   wherein the second transition condition includes a case in which the BLER is smaller than 10%.

14. The method of claim 12, wherein the third transition condition includes at least one of a case in which reference signal received power (RSRP) is equal to or smaller than −80 dBm, a case in which transmission power is larger than 20 dBm, a case in which the BSR index is larger than or equal to 30% for 3 seconds, a case in which the BLER is larger than 30%, or a case in which the TTIB is activated, and
   wherein the fourth transition condition includes a case in which the BLER is smaller than 30%.

15. The method of claim 9, wherein, when a number of identified frequency bands to transmit control information is two or more, an optimal mode makes return loss small in frequency bands including the two or more frequency bands or selects one frequency band from among the two or more frequency bands and makes return loss of the selected frequency band small.

16. The method of claim 9, wherein, even when the determined antenna mode is an optimal mode, the method further includes configuring the antenna according to a normal mode in a time interval in which the control information is not transmitted and configuring the antenna according to the optimal mode in a time interval in which the control information is transmitted.

* * * * *